(12) United States Patent
Pirwass

(10) Patent No.: US 8,235,441 B2
(45) Date of Patent: Aug. 7, 2012

(54) PORTABLE WORK MACHINE FOR PUMPING CONCRETE OR THICK LIQUIDS AND HAVING A CARRYING FRAMEWORK AND A COVERING HOOD

(75) Inventor: Frank Pirwass, Filderstadt (DE)

(73) Assignee: Putzmeister Engineering GmbH, Aichtal (DE)

(*) Notice: Subject to any disclaimer, the term of this patent is extended or adjusted under 35 U.S.C. 154(b) by 633 days.

(21) Appl. No.: 12/311,645

(22) PCT Filed: Sep. 28, 2007

(86) PCT No.: PCT/EP2007/060285
§ 371 (c)(1),
(2), (4) Date: Apr. 7, 2009

(87) PCT Pub. No.: WO2008/068077
PCT Pub. Date: Jun. 12, 2008

(65) Prior Publication Data
US 2010/0045064 A1  Feb. 25, 2010

(30) Foreign Application Priority Data
Dec. 7, 2006 (DE) .......................... 10 2006 058 070

(51) Int. Cl.
*B60P 3/16* (2006.01)
*B60P 3/00* (2006.01)
*B62D 33/00* (2006.01)

(52) U.S. Cl. .................. 296/24.3; 180/89.1; 180/69.24; 180/89.17; 417/234

(58) Field of Classification Search ................. 180/89.1, 180/69.2, 69.24, 89.17; 296/22, 24.3, 146.3, 296/24.32; 137/377, 899; 417/234, 572
See application file for complete search history.

(56) References Cited

U.S. PATENT DOCUMENTS

| | | | | | |
|---|---|---|---|---|---|
| 3,181,469 | A | * | 5/1965 | Schumann | 417/361 |
| 3,478,958 | A | * | 11/1969 | Bowen et al. | 417/234 |
| 3,807,706 | A | * | 4/1974 | Kugle et al. | 366/27 |
| 3,815,965 | A | * | 6/1974 | Ostwald | 312/100 |

(Continued)

FOREIGN PATENT DOCUMENTS

DE  81 09 598  3/1982
(Continued)

OTHER PUBLICATIONS

International Search Report.

*Primary Examiner* — Devon C Kramer
*Assistant Examiner* — Nathan Zollinger
(74) *Attorney, Agent, or Firm* — Collard & Roe, P.C.

(57) ABSTRACT

A transportable thick matter pump includes a carrying framework for machine assemblies. A covering hood reaches at least partly over and is fixed in place on the carrying framework and includes a frame skeleton having a rectangular roof frame and two rectangular side frames connected with the roof frame at their upper edge and releasably attached to the carrying framework with their lower edge. A basin-shaped roof cover is inserted into the roof frame, with its opening facing upward, while the side frames carry at least one side paneling element configured as a self-supporting plastic molded hinged door articulated on at the upper edge of the related side frame. The frame skeleton openings formed by the roof frame and the two side frames, on the face-side hood ends, are covered by a removable end cap configured as a self-supporting plastic molded part.

21 Claims, 6 Drawing Sheets

U.S. PATENT DOCUMENTS

| | | | | |
|---|---|---|---|---|
| 4,022,550 A | * | 5/1977 | Brink et al. | 417/234 |
| 4,117,342 A | | 9/1978 | Melley, Jr. | |
| 4,136,432 A | | 1/1979 | Melley, Jr. | |
| 5,383,703 A | * | 1/1995 | Irvine, III | 296/24.45 |
| 5,550,333 A | * | 8/1996 | Whiteman, Jr. | 181/204 |
| 6,053,563 A | | 4/2000 | Edgeller et al. | |
| 6,082,809 A | | 7/2000 | Edgeller et al. | |
| 6,089,650 A | | 7/2000 | Edgeller et al. | |
| 6,116,374 A | | 9/2000 | Westerbeke, Jr. | |
| 2004/0071567 A1 | | 4/2004 | Stickland et al. | |
| 2005/0195681 A1 | * | 9/2005 | Gembala | 366/46 |

FOREIGN PATENT DOCUMENTS

| | | |
|---|---|---|
| DE | 42 01 077 | 7/1993 |
| DE | 298 00 540 | 4/1998 |
| DE | 199 30 371 | 2/2000 |

* cited by examiner

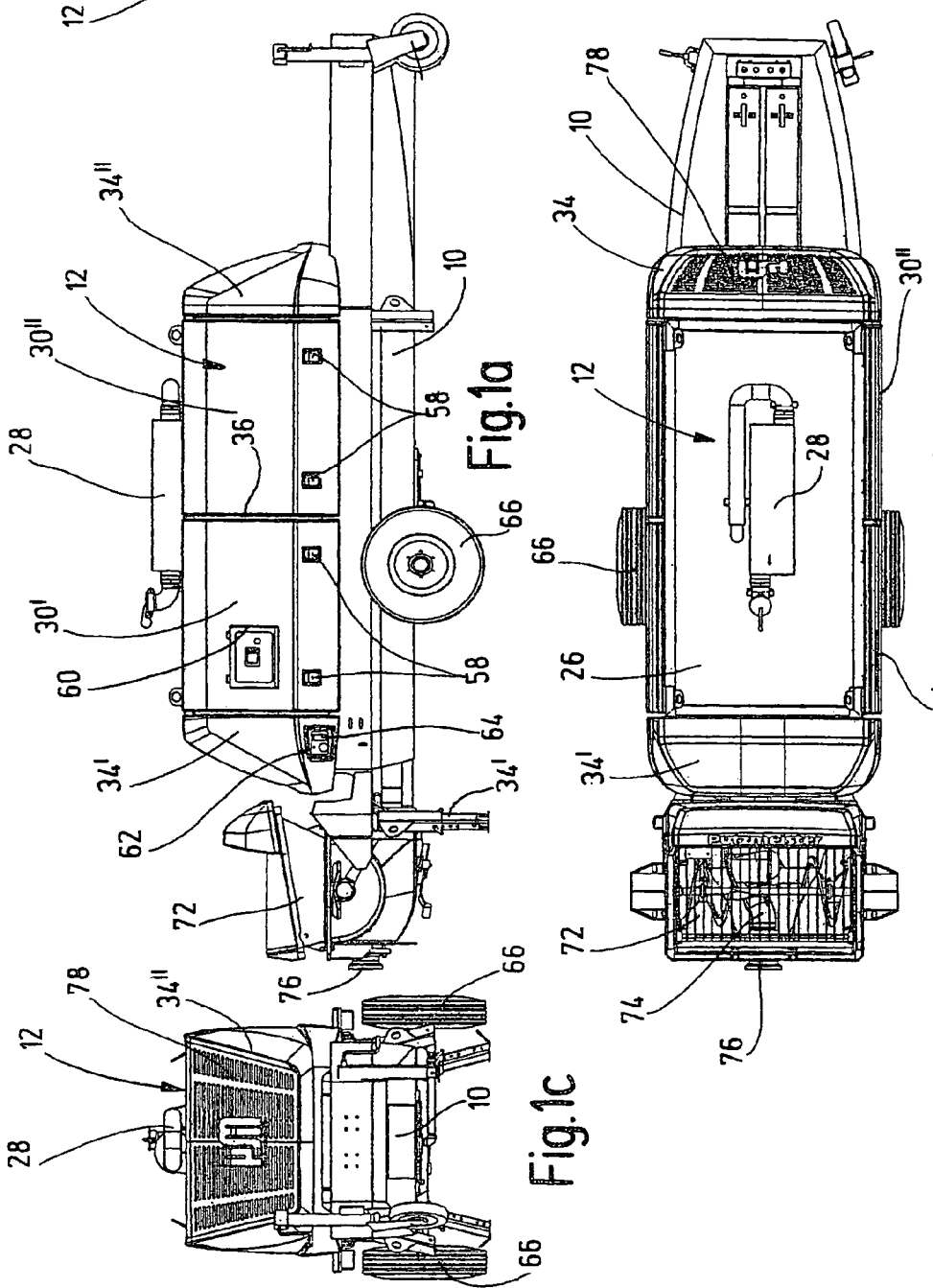

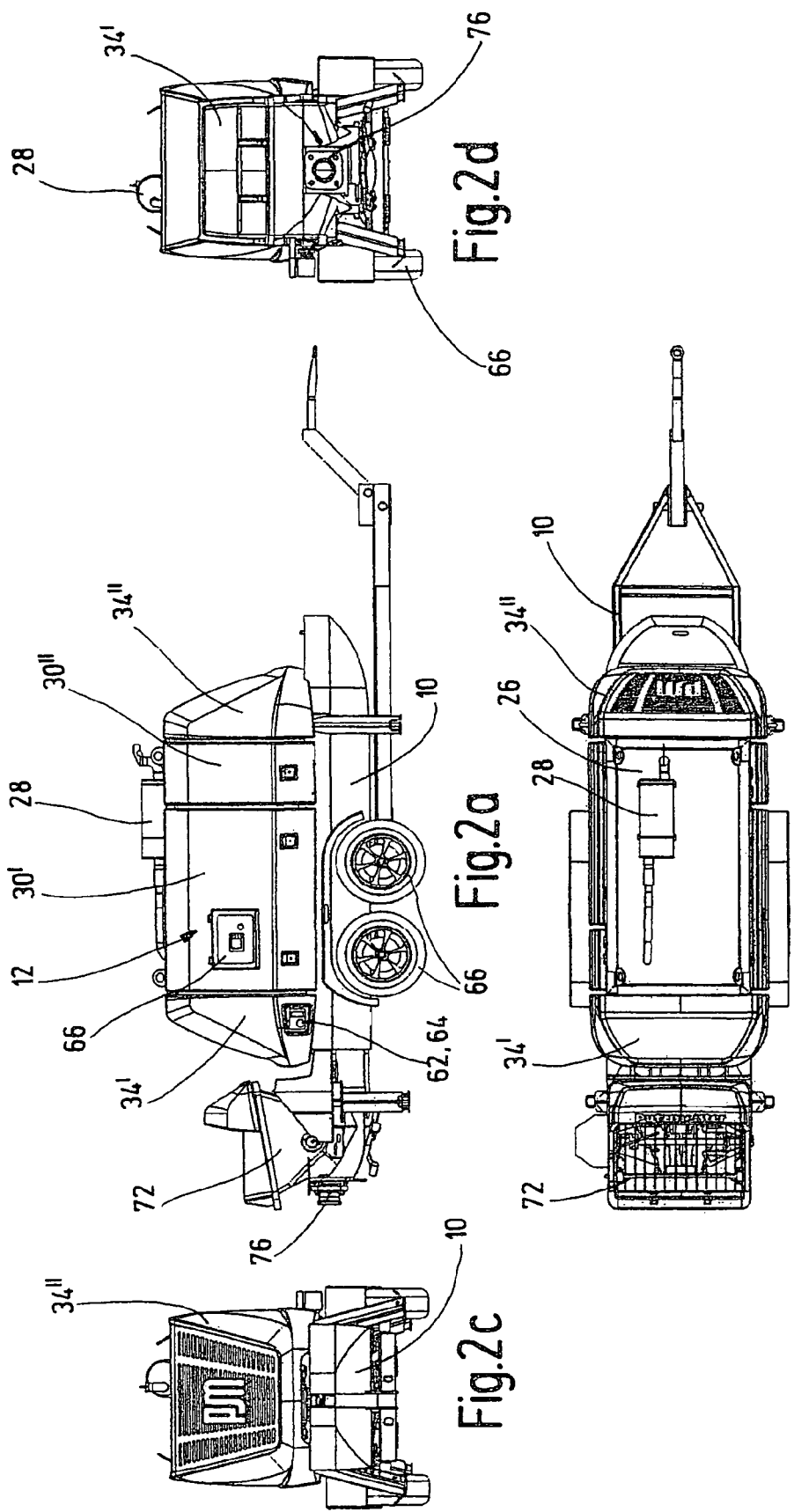

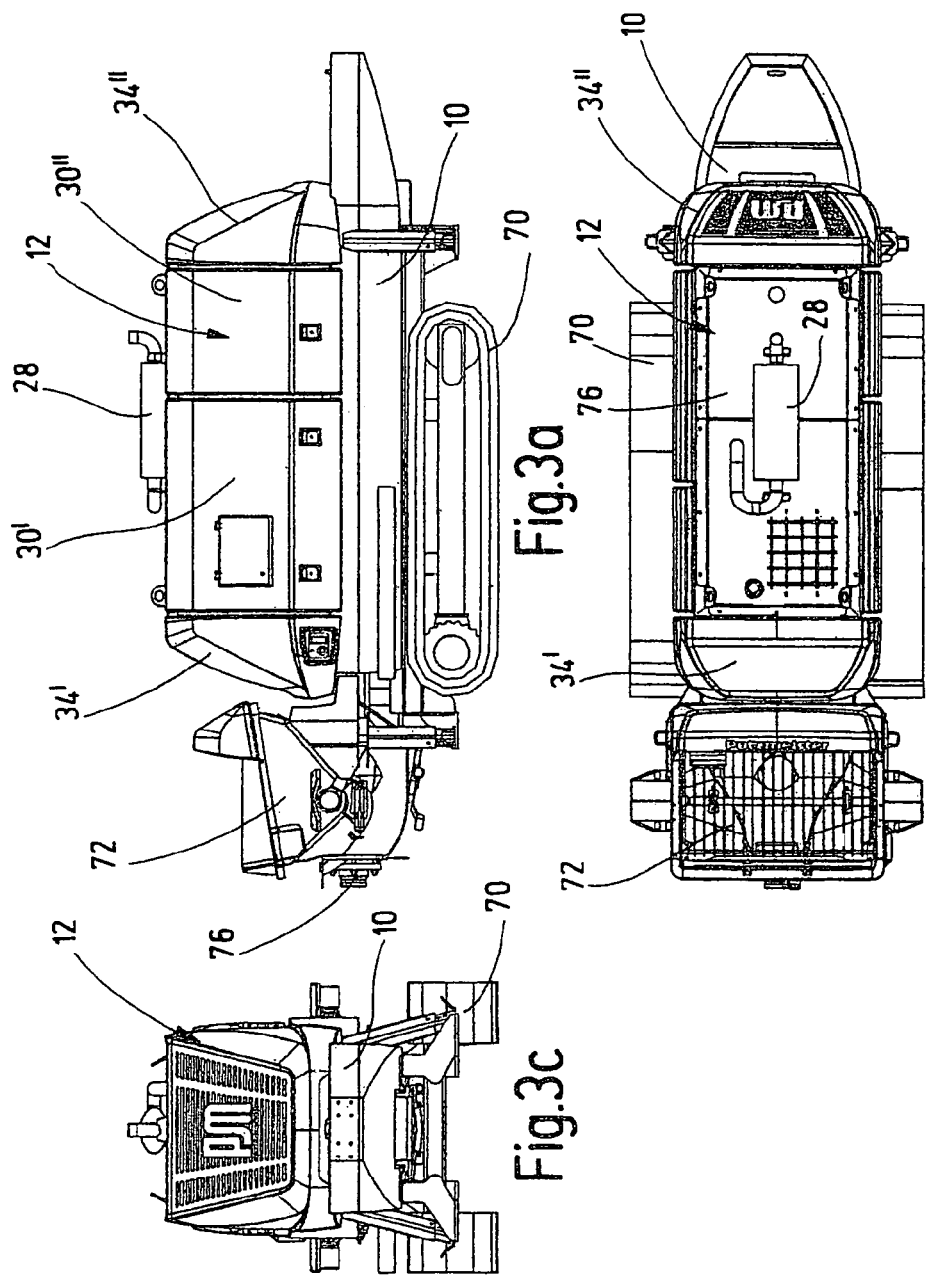

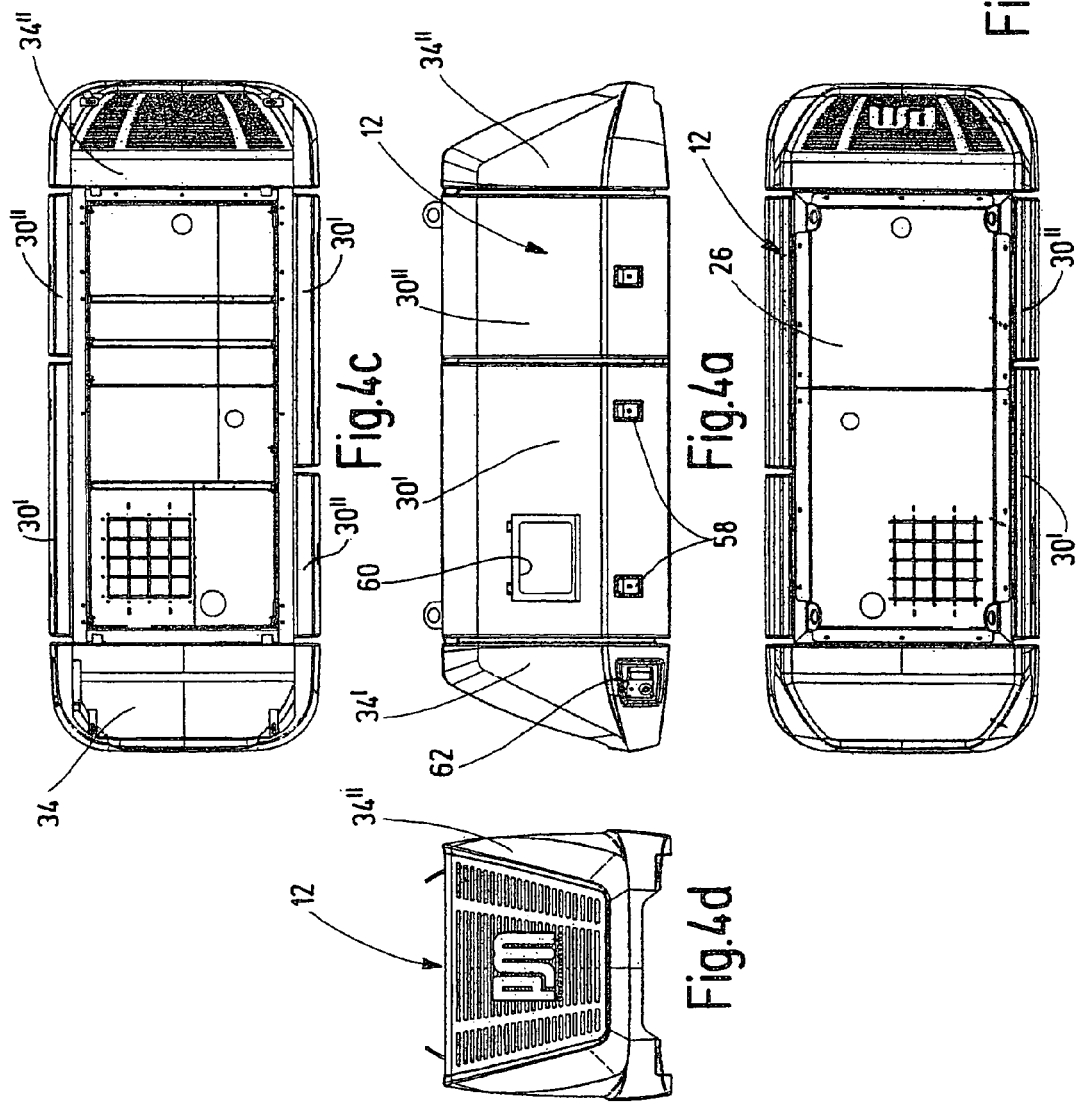

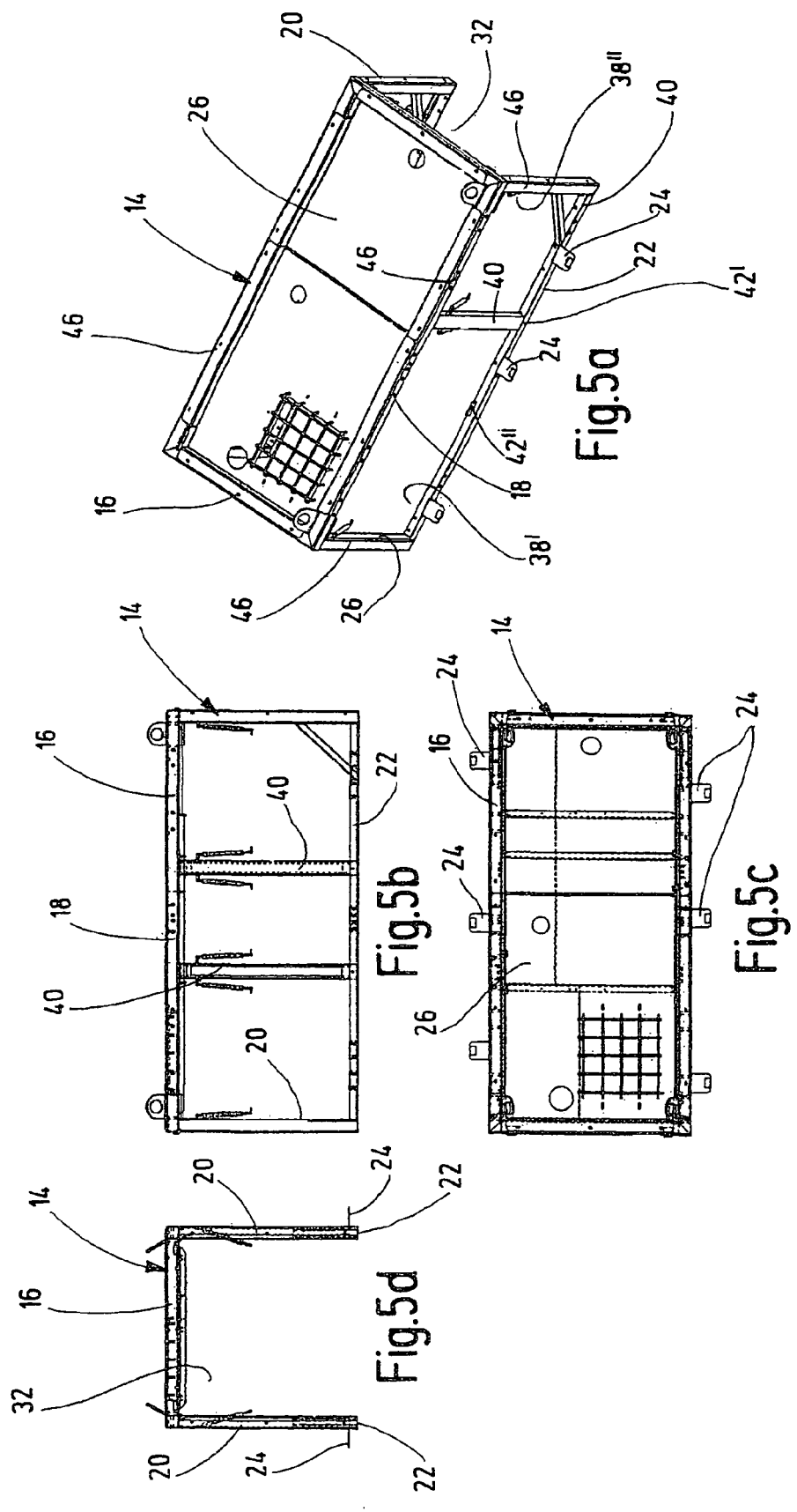

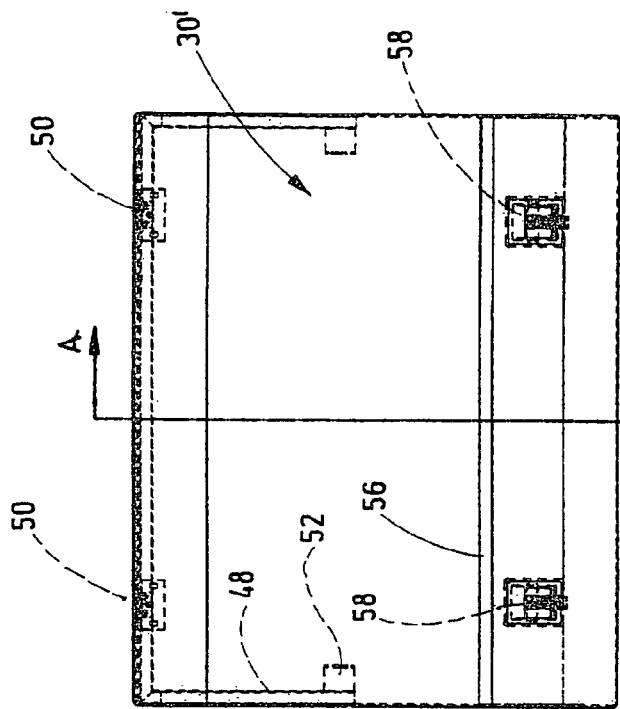
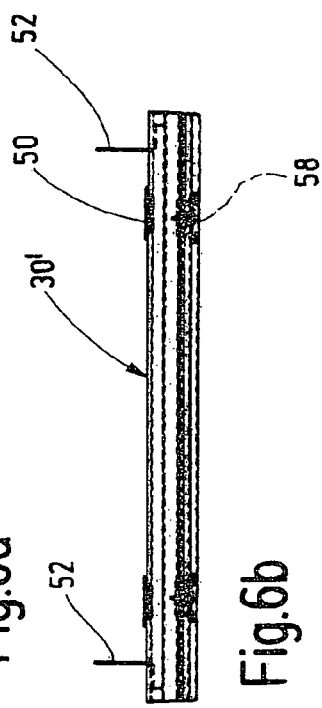
Fig.6a
Fig.6b
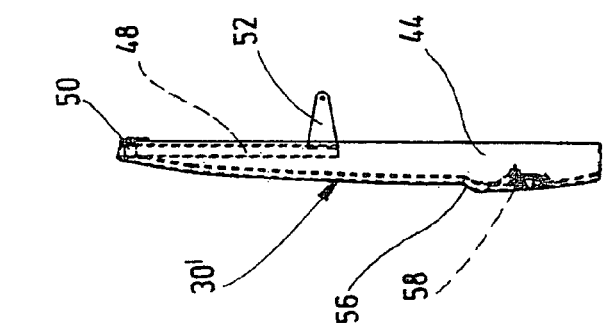
Fig.6c
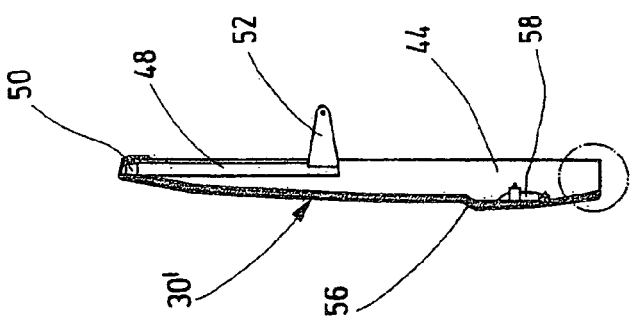
Fig.7a
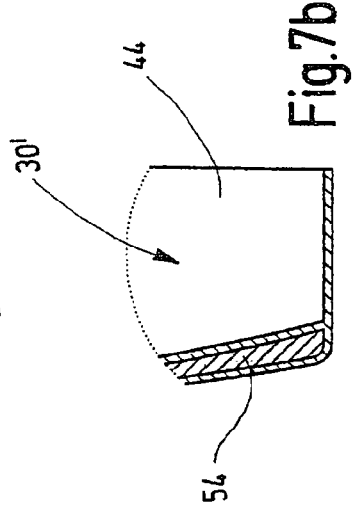
Fig.7b

PORTABLE WORK MACHINE FOR PUMPING CONCRETE OR THICK LIQUIDS AND HAVING A CARRYING FRAMEWORK AND A COVERING HOOD

CROSS REFERENCE TO RELATED APPLICATIONS

This application is the National Stage of PCT/EP2007/060285 filed on Sep. 28, 2007, which claims priority under 35 U.S.C. §119 of German Application No. 10 2006 058 070.2 filed on Dec. 7, 2006. The international application under PCT article 21(2) was not published in English.

The invention relates to a work machine, particularly a thick matter pump or concrete pump, having a carrying framework for machine assemblies and having a covering hood that reaches at least partly over the carrying framework, and is fixed in place on the latter, which hood has at least one door that can be moved between an open position and a closed position.

Concrete pumps of this type, which are intended for stationary use on construction sites, have a carrying framework provided with casters, for example, which framework is covered by a covering hood adapted to the size of the machine assemblies. The door situated in the covering hood is supposed to allow access to the machine assemblies, for example for maintenance purposes.

The invention is based on the task of improving a work machine of the type indicated initially, in such a manner that a modular construction of the covering hood, which can be adapted to different machine sizes, is guaranteed.

To accomplish this task, the characteristics indicated in claim 1 are proposed. Advantageous embodiments and further developments are evident from the dependent claims.

The solution according to the invention consists, above all, in that the covering hood has a frame skeleton having a rectangular roof frame and two rectangular side frames that are connected with the roof frame at their upper edges; that the side frames are releasably attached to the carrying framework with their lower edge; that a roof cover is inserted into the roof frame; that the side frames carry at least one side paneling element configured as a self-supporting plastic molded part, of which at least one element is configured as a hinged door articulated on at the upper edge of the related side frame; and that the frame skeleton opening formed by the roof frame and the two side frames, on the face-side hood ends, is covered by a removable end cap configured as a self-supporting plastic molded part. With these measures, it is possible to design a plurality of covering hoods of different sizes, using only two or three different side paneling elements, in the manner of a modular system, in which hoods only the frame skeleton still has to be adapted to the size of the machine and the carrying framework, also in modular manner, by means of adding or removing skeleton struts or posts.

According to a preferred embodiment of the invention, each side frame carries at least two side paneling elements configured as a hinged door, which elements can also have different widths. In this connection, it is practical if a door post that delimits the door opening is inserted into the side frame in the region of the parting point between the two hinged doors. In order to allow particularly simple adaptation to the internal structure of the work machine, the door posts for hinged doors of different widths can be releasably attached in different positions along the side frames.

For reasons of strength, it is practical if the hinged doors have a circumferential reinforcement edge directed toward the hood interior, while they are freely shaped toward the outside. The reinforcement edge of the hinged doors can be provided, at least in part, with a sealing strip that lies against the frame struts and door posts of the frame skeleton in the closed state, forming a seal.

In order to obtain sufficient stiffening of the hinged doors at the lowest possible weight, the hinged doors have a wall thickness that varies over their height and/or width. In this connection, it is practical if the hinged doors have a greater wall thickness in their upper region than in their lower region.

A further improvement in this regard can be achieved in that the hinged doors have at least one crosswise and/or lengthwise bead or step. Furthermore, a U-shaped half frame made of metal, which is open toward the bottom, can be set onto the reinforcement edge of the hinged doors, onto which frame functional elements, such as hinge elements, gas springs, or door lock elements engage. It is advantageous if the hinged doors are configured as self-supporting plastic molded parts, in the material of which reinforcement parts and/or structural parts can additionally be embedded. The reinforcement parts and/or structural parts can consist of insulation materials, particularly of balsa wood, or have a honeycomb structure. It is practical if the side paneling elements and/or the face-side end caps have a laminate structure having a wall thickness that decreases toward the bottom. Furthermore, a window opening is formed into at least one of the side paneling elements or into at least one of the end caps, which opening allows a view into or access into the hood interior, or in which the switching and display elements for the machine control are inserted.

According to a preferred embodiment of the invention, the face-side end caps are fixed in place on the roof frame with tabs that point upward, and are anchored on the side frames at their lower ends, preferably by means of screws. It is practical if a drive motor is situated in the region of one of the end caps. It is advantageous if the drive motor is configured as an internal combustion engine that has an exhaust system disposed on the roof cover. For this purpose, it is advantageous if the roof cover is configured in basin shape, so that the exhaust system projects only slightly above the top edge of the roof. Furthermore, at least one of the end caps can be provided with ventilation openings in the form of perforations, slits, or holes.

Another preferred embodiment of the invention provides that the carrying framework has a chassis that is equipped, for example, with casters on a single axle, on tandem axles, or on rail axles, or that is configured as a caterpillar chassis.

In the following, the invention will be explained in greater detail using an exemplary embodiment shown schematically in the drawing. This shows:

FIG. 1*a* to *d*, a side view, a top view, and two face-side views of a stationary concrete pump on a trailer having a single-axle chassis;

FIG. 2*a* to *d*, a side view, a top view, and two face-side views of a stationary concrete pump on a trailer having a double-axle chassis;

FIG. 3*a* to *d*, a side view, a top view, and two face-side views of a concrete pump having a caterpillar chassis;

FIG. 4*a* to *e*, a side view, a top view, a bottom view, and two face-side views of a covering hood for a concrete pump;

FIG. 5*a* to *d*, a diagrammatic view, a side view, a top view, and a face-side view of a frame skeleton of a covering hood;

FIG. 6*a* to *c*, a side view, a top view, and a face-side view of a hinged door for a covering hood;

FIG. 7*a* a section along the section line A-A of FIG. 6*a*;

FIG. 7*b* a section from FIG. 7*a* in an enlarged representation.

The work machines shown in the drawing are concrete pumps for stationary use on construction sites. The concrete pumps have a mobile carrying framework 10 for the machine assemblies, and a covering hood 12 that partly covers the carrying framework 10 and is fixed in place on the latter. The covering hood 12 comprises a frame skeleton 14 having a rectangular roof frame 16 and two rectangular side frames 20 that are connected with the roof frame 16 at their upper edges 18. The side frames 20 have attachment tabs 24 that project outward, at their lower edge 22, with which tabs they are attached to the carrying framework 10. A basin-shaped roof cover 26 that points upward with its opening is inserted into the roof frame 16; in the exemplary embodiment shown in FIG. 1 to 3, it is intended for partly countersunk accommodation of an exhaust system 28 for a drive motor, not shown. The side frames 20 each carry two side paneling elements 30', 30", configured as self-supporting plastic molded parts, which are configured, in the exemplary embodiments shown, as hinged doors articulated on at the upper edge 18 of the related side frame 20. The frame skeleton openings formed by the roof frame 16 and the two side frames 20, on the face-side hood ends, are each covered by a removable end cap 34', 34", configured as a self-supporting plastic molded part.

In the exemplary embodiment shown in FIG. 1a to d, the hinged doors 30', 30" are configured to have the same width, while in the exemplary embodiments according to FIG. 2a to d, as well as FIG. 3a to d, they have different widths, in each instance. A door post 40 that delimits the related door opening 38', 38" is inserted into the side frame 20 of the frame skeleton 14, in each instance, in the region of the parting point 36 between two hinged doors 30', 30". In adaptation to the width of the hinged doors 30', 30" used, the door post 40 can be attached in different positions 42', 42" along the side frame 20 (cf. FIGS. 5a and b).

As is particularly evident from FIG. 6a to c and 7a and b, the hinged doors 30', 30" have a circumferential reinforcement edge 44 directed toward the hood interior, while they are freely shaped, to a great extent, toward the outside. In the closed state, the reinforcement edge 44 lies against the frame struts 46 and the door post 40 of the frame skeleton 14, forming a seal. In the upper region, a U-shaped half frame 48 made of metal, which is open toward the bottom, is set onto the reinforcement edge 44 of the hinged doors 30', 30". Functional elements, such as hinges 50 or gas pressure springs, the latter by way of the tabs 52, engage onto the half frame 48. To increase the rigidity and to improve noise protection, reinforcement parts and/or structural parts 54 can additionally be embedded into the material of the hinged doors 30', 30"; these can consist of insulation materials, such as balsa wood, or be embedded with a honeycomb structure. A further improvement in this regard is achieved by means of the crosswise steps 56 disposed in the lower door region, in the hinged doors 30', 30". Furthermore, there are door lock elements 58 in the lower region of the hinged doors 30', 30", which can be activated from the outside and can be locked using closure sheets of the frame skeleton, not shown. Another particular feature of the invention consists in that the side paneling elements 30', 30" and/or the face-side end caps 34', 34" have a laminate structure having a wall thickness that decreases toward the bottom.

The face-side end caps 34', 34" are fixed in place on the roof frame 16 with tabs that point upward, and are anchored on the adjacent side frames 20 at their lower ends, for example by means of screws.

In the case of all three exemplary embodiments according to FIG. 1 to 3, one of the hinged doors 30' as well as one of the end caps 34' is each provided with a window 60, 62, which can be equipped with a transparent pane or with display and control elements 64 of a display and control device.

In the exemplary embodiments shown in FIGS. 1 and 2, the carrying framework 10 is configured as a single-axle or double-axle trailer having casters 66, as well as a drawbar 67. To relieve stress on the casters in the operating state, telescoping support feet 68 are provided, which can be supported on the substratum, raising the casters 66.

In the case of the exemplary embodiment according to FIG. 3a to d, the carrying framework 10 is equipped with a self-propelled caterpillar chassis 70. Here again, the support feet 68 serve to lift the caterpillar chassis 70 from the substratum in the operating state.

In the rear region, there is a material application container 72 for accommodating concrete, in the case of all three exemplary embodiments. Within the material application container 72, there is a pipe shunt 74 configured as an S-pipe, which can be connected, on its entry side, alternately to the feed cylinders of a two-cylinder thick matter pump, not shown, disposed on the carrying framework, and, on its exit side, opens into a pipe connector 76 that is passed through the material application container 72 to the outside. A feed line that is passed to the construction site, in the form of a feed hose or a feed pipe, can be connected with the pipe connector 76.

The drive motor of the concrete pump is situated on the carrying framework 10, under one of the two end caps 34", which is equipped with air slits 78 for air feed.

A particular feature of the invention consists in that the covering hood 12, which consists of the frame skeleton 14, the hinged doors 30', 30", and the end caps 34', 34", can be adapted, in modular manner, to different machine sizes, and can be configured freely in its outer shape, from an ergonomic and esthetic point of view.

In summary, the following should be stated: The invention relates to a work machine, particularly a transportable thick matter pump or concrete pump. The work machine comprises a carrying framework 10 for machine assemblies, as well as a covering hood 12 that reaches at least partly over the carrying framework, and is fixed in place on the latter. The covering hood in turn comprises a frame skeleton 14 having a rectangular roof frame 16 and two rectangular side frames 20 that are connected with the roof frame 16 at their upper edge, whereby the side frames are releasably attached to the carrying framework 10 with their lower edge 22. A basin-shaped roof cover 26 is inserted into the roof frame, with its opening facing upward, while the side frames 20 carry at least one side paneling element 30', 30" configured as a self-supporting plastic molded part, of which at least one element is configured as a hinged door articulated on at the upper edge 18 of the related side frame 20. Furthermore, the frame skeleton openings 32 formed by the roof frame 16 and the two side frames 20, on the face-side hood ends, are covered by a removable end cap 34', 34" configured as a self-supporting plastic molded part.

The invention claimed is:

1. A work machine for pumping thick matter, the work machine having:
   a carrying framework for machine assemblies, and
   a covering hood reaching at least partly over the carrying framework and fixed in place on the carrying framework, the covering hood having:
     a frame skeleton having:
       a rectangular roof frame, and
       two rectangular side frames having upper edges and lower edges, connected with the rectangular roof frame at the upper edges, and releasably attached to the carrying framework with the lower edges, a roof cover inserted into the rectangular roof frame, at least four side paneling elements, a first side frame of the two rectangular side frames carrying at least two side paneling elements of the at least four side paneling elements and a second side frame of the two rectangular side frames carrying at least two side paneling elements of the at least four side paneling elements, each side paneling element of the at least four side paneling elements being configured as a respective hinged door articulated on the two rectangular side frames at a respective upper edge of the upper edges of the two rectangular side frames, and each side paneling element of the at least four side paneling elements being moveable between an open position and a closed position, removable end caps covering frame skeleton openings, the frame skeleton openings being formed by the roof frame and the two rectangular side frames, on face-side hood ends of the frame skeleton, and door posts disposed in the two rectangular side frames in regions of respective parting points between two hinged doors of the at least four side paneling elements, the door posts delimiting door openings disposed in the two rectangular side frames wherein the at least four side paneling elements and the removable end caps are configured as self-supporting plastic molded parts, and wherein the door posts can be releasably attached in different positions along the two rectangular side frames, in adaptation to widths of the hinged doors.

2. The work machine according to claim 1, wherein the hinged doors have different widths.

3. The work machine according to claim 1, wherein each hinged door of the hinged doors has a respective height, a respective width, and a respective wall thickness varying over the respective height and/or over the respective width.

4. The work machine according to claim 1, wherein each hinged door of the hinged doors has a respective upper region, a respective lower region, and a greater wall thickness in the respective upper region than in the respective lower region.

5. The work machine according to claim 1, wherein each hinged door of the hinged doors:

has a respective circumferential reinforcement edge directed toward an interior of the covering hood, and is freely shaped, respectively, toward an outside of the covering hood.

6. The work machine according to claim 5, wherein each circumferential reinforcement edge is equipped, at least in part, with a sealing strip, and wherein each sealing strip lies against frame struts and the door posts of the frame skeleton in the closed position of the door posts, forming a seal.

7. The work machine according to claim 1, wherein each hinged door has at least one crosswise and/or lengthwise bead or step.

8. The work machine according to claim 5, further comprising a U-shaped half frame made of metal, having a bottom, and being open toward the bottom, wherein the U-shaped half frame is set onto the circumferential reinforcement edges.

9. The work machine according to claim 8, further comprising functional elements engaging onto the U-shaped half frame.

10. The work machine according to claim 1, wherein reinforcement parts and/or structural parts are embedded in a material of the hinged doors.

11. The work machine according to claim 10, wherein the reinforcement parts and/or the structural parts consist of balsa wood and/or have a honeycomb structure.

12. The work machine according to claim 1, wherein window openings are formed into at least one side paneling element of the at least four side paneling elements or into at least one end cap of the removable end caps.

13. The work machine according to claim 1, wherein the carrying framework has a chassis.

14. The work machine according to claim 1, wherein the at least four side paneling elements and/or the removable end caps have a respective laminate structure having both a bottom and a wall thickness decreasing toward the bottom.

15. The work machine according to claim 1, wherein the removable end caps have lower ends, are fixed in place on the roof frame with upward-pointing tabs, and are anchored on the two rectangular side frames at the lower ends.

16. The work machine according to claim 1, wherein the roof cover is basin-shaped.

17. The work machine according to claim 1, further comprising a drive motor covered by one of the removable end caps, wherein the drive motor is disposed on the carrying framework.

18. The work machine according to claim 17, wherein at least one removable end cap of the removable end caps is provided with ventilation openings.

19. The work machine according to claim 17, wherein the roof cover is basin-shaped, and wherein the drive motor is configured as an internal combustion engine having an exhaust system disposed in the basin-shaped roof cover.

20. A work machine for pumping thick matter, the work machine having:

a carrying framework for machine assemblies, and a covering hood reaching at least partly over the carrying framework and fixed in place on the carrying framework, the covering hood having:

a frame skeleton having:

a rectangular roof frame, and two rectangular side frames having upper edges and lower edges, connected with the rectangular roof frame at the upper edges, and releasably attached to the carrying framework with the lower edges, a roof cover inserted into the roof frame, at least one side paneling element carried by at least one side frame of the two rectangular side frames, the at least one side paneling element being configured as a hinged door articulated on the at least one side frame at an upper edge of the at least one side frame, and the at least one side paneling element being moveable between an open position and closed position, and removable end caps covering frame skeleton openings, the frame skeleton openings being formed by the roof frame and the two rectangular side frames, on face-side hood ends of the frame skeleton, wherein the at least one side paneling element and the removable end caps are configured as self-supporting plastic molded parts, and wherein the hinged door has a height, a width, and a wall thickness varying over the height and/or over the width.

21. A work machine for pumping thick matter, the work machine having:
a carrying framework for machine assemblies, and
a covering hood reaching at least partly over the carrying framework, and fixed in place on the carrying framework, the covering hood having:
a frame skeleton having:
a rectangular roof frame, and
two rectangular side frames having upper edges and lower edges, connected with the rectangular roof frame at the upper edges, and releasably attached to the carrying framework with the lower edges,
a roof cover inserted into the roof frame,
at least one side paneling element carried by at least one side frame of the two rectangular side frames and configured as a hinged door articulated on the at least one side frame at an upper edge of the at least one side frame, the at least one side paneling element being moveable between an open position and a closed position,
removable end caps covering frame skeleton openings formed by the roof frame and the two rectangular side frames, on face-side hood ends of the skeleton frame, and
a U-shaped half frame made of metal, having a bottom, and being open toward the bottom,
wherein the at least one side paneling element and the removable end caps are configured as self-supporting plastic molded parts,
wherein the hinged door:
has a circumferential reinforcement edge directed toward an interior of the covering hood, and
is freely shaped toward an outside of the covering hood, and
wherein the U-shaped half frame is set onto the circumferential reinforcement edge.

* * * * *